Sept. 19, 1944.   I. L. HAAG ET AL   2,358,706
PROCESS FOR PRODUCING CALCIUM CUPROXY CHLORIDE
Filed March 27, 1940
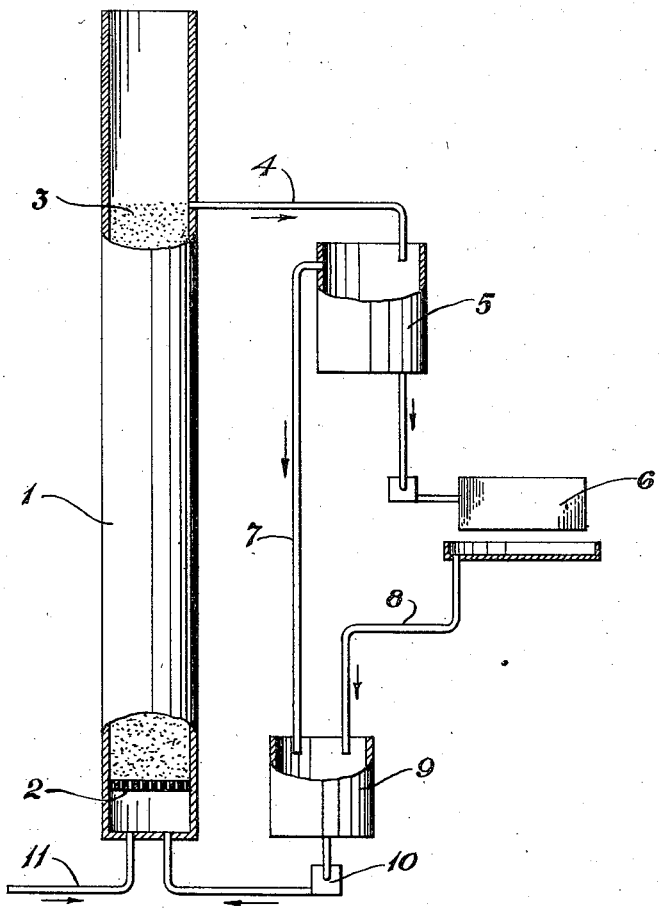
Ivan L. Haag
Robert Pfanstiel INVENTORS
BY
George T. Johnson ATTORNEY Patented Sept. 19, 1944

2,358,706

UNITED STATES PATENT OFFICE 2,358,706

PROCESS FOR PRODUCING CALCIUM
CUPROXY CHLORIDE

Ivan L. Haag, Cleveland, and Robert Pfanstiel, Lakewood, Ohio, assignors to E. I. du Pont de Nemours & Company, Wilmington, Del., a corporation of Delaware Application March 27, 1940, Serial No. 326,190

2 Claims. (Cl. 23—85)

This invention relates to the manufacture of complex compounds of copper oxide and calcium chloride, and is particularly directed to processes in which an aqueous solution containing calcium chloride and ammonium chloride is caused to act on metallic copper while aeration of the solution and continuous relative motion between the copper and the solution are simultaneously effected.

Various complex compounds of copper oxide and calcium chloride are known to be effective fungicides, and many methods have been proposed for making such compounds at a cost competitive with that of such copper fungicides as Bordeaux mixture. For one reason or another, however, these methods do not appear to have been adopted on a large scale, as is indicated by the fact that the products produced have not been generally available as commercial fungicides.

A complex compound of copper oxide and calcium chloride thought to have the empirical formula $4Cu(OH)_2 \cdot CaCl_2 4H_2O$ and reported to have particularly desirable fungicidal properties is described in British Patent 425,395 granted to Souviron et al. Compositions of this general type, in which copper oxide and calcium chloride are associated together with various proportions of water as complex compounds, may be designated for convenience of reference as "calcium cuproxy chlorides," although by such a designation a particular structural formula or a particular degree of hydration is not mean to be ascribed.

Despite outstanding merit as fungicides, the calcium cuproxy chlorides have found a restricted field of usefulness because they have not heretofore been available at a cost comparable with other copper fungicides. The relatively high cost of calcium cuproxy chloride is attributable to the fact that methods heretofore available for their preparation have been slow, cumbersome, and generally uneconomical.

Of the methods proposed for making calcium cuproxy chlorides, the one which has probably the greatest economic feasibility is that described in the above-mentioned Souviron British patent, in which metallic copper is immersed in a solution containing calcium and ammonium chlorides and the solution is blown with air, whereby the copper is dissolved and the product is precipitated. However, even by this method the rate of production of calcium cuproxy chloride relative to the size and extent of the equipment involved is so low that the cost of the ultimate product is high. An alternative method suggested in the Souviron British patent is to carry out the reaction in two stages, first permitting mother liquor from a previous operation containing ammonium chloride, calcium chloride and cupric copper in solution to stand in contact with metallic copper, whereby a portion of the copper is taken into solution, and thereafter withdrawing the solution and separately aerating it to precipitate calcium cuproxy chloride. However, by this method the overall rate of production is not increased, hence the cost of the product is not lowered.

Now we have found that calcium cuproxy chlorides may be easily, rapidly and economically produced by causing an aqueous solution of calcium chloride and ammonium chloride to act on metallic copper while simultaneously aerating the solution and causing continuous relative motion between the copper and the solution. According to our novel processes, calcium cuproxy chlorides can be produced at a cost competitive with that of compounds in common use as copper fungicides.

When calcium cuproxy chlorides are made by aerating a solution of calcium and ammonium chlorides in contact with metallic copper, the principal factor governing the production rate of the final product for a given size of equipment is the rate of dissolution of the copper. The chemical reactions involved in the process are none too well understood, but since the copper combined in the final product is substantially all in the cupric state, it must be assumed that the air oxidizes the copper. On the other hand, it is known that cupric copper compounds in solution are reduced to the cuprous stage by contact with metallic copper, one equivalent of copper going into solution for each equivalent of cupric copper so reduced. Whatever may be the chemical mechanism of the reaction, we have found that the highest copper dissolution rate is obtained when the reaction solution is simultaneously aerated and caused to circulate in contact with the copper.

A possible explanation for this increased copper dissolution rate may be the fact that circulation of the reaction liquor prevents the precipitated product from settling upon the copper, and the surface of the copper therefore remains exposed to the corroding action of the reaction liquor and the air. The advantage of keeping the surface of the copper clean and active in this manner will be appreciated when it is considered that the copper ordinarily used is placed in the reaction vessel, without orderly arrangement, in the form of pieces of metallic scrap having various sizes and shapes. When such scrap is coated over with settled precipitate or intermediate products of reaction the restoration of the surfaces to a clean, active state presents serious mechanical problems.

In processes heretofore available for making calcium cuproxy chlorides from scrap copper, other time-consuming difficulties have also been encountered. Thus, the settling of the precipitated product on and around the copper scrap has made difficult the ultimate discharge of the product from the reaction vessel. When circulation of the reaction liquor is employed, on the other hand, there is no opportunity for the product to settle, and consequently the product may be easily and completely removed as a suspension in the reaction liquor.

The uniform and effective distribution of air through the reaction liquor is likewise facilitated by circulating the liquor in accordance with a process of our invention. Even when there is a considerable amount of product present as a precipitate in the liquor, the freedom from settling avoids clogging of passages through which the solution is aerated. This uniform distribution of the air permits the reaction to go at its greatest possible speed.

The nature of our novel processes for producing calcium cuproxy chlorides and their manner of application may be better understood by reference to the following specific examples, although it will be understood that such examples are given merely for purposes of illustration and that those skilled in the art may adopt numerous modifications without departing from the scope of our invention.

Example 1 illustrates an embodiment of our invention in which a solution containing calcium chloride and ammonium chloride is caused to act on metallic copper while it is being aerated and in which continuous relative motion between the copper and the solution is effected by pumping the solution through the reaction vessel by outside means, this embodiment being further illustrated in the flow sheet of the accompanying drawing.

Example 1

Into a cylindrical reaction vessel 1 having a height ten times its diameter and equipped with a perforated false bottom 2 adapted to act as an air distributor there was placed sufficient metallic copper 3, in the form of cut-up scrap, to fill the tank above the false bottom to a height equal to about 7.5 times its diameter. Into this tank there was then pumped a solution containing per hundred parts of its total weight, 17 parts of calcium chloride dihydrate ($CaCl_2 \cdot 2H_2O$), 3.3 parts of ammonium chloride ($NH_4Cl$), and enough ammonium hydroxide to make the solution just alkaline to litmus. An overflow pipe 4 located opposite the top of the copper in the reaction vessel led into a settling tank 5 from which the heavy slurry was pumped to a filter press 6. Means 7 and 8 were provided for collecting clear liquor from the settling tank, as well as the filtrate from the filter press, and returning it to a storage tank 9 from which it could be recirculated through the reaction vessel by means of pump 10.

When the reaction tank had filled with solution compressed air was admitted below the false bottom through line 11 in a manner such that the air was broken up and bubbled upward through the reaction solution. The rate of air addition was such that a volume of air equal to about four times the volume of the reaction vessel up to the top of the copper was blown through the solution each minute.

Simultaneously with this aeration the liquor was caused to circulate over the copper co-currently with the air, the rate of circulation being such that a complete change of the liquor in the reaction tank was effected about 1.5 times per minute.

Under the above-described conditions the dissolution of copper and its precipitation as calcium cuproxy chloride proceeded rapidly. The temperature of the solution rose to about 50° C. and remained near that point throughout the reaction. The color of the solution quickly became dark blue and a short time after aeration and recirculation was started the formation of precipitate was noted. A sample of the filtered and washed product was found by analysis to correspond approximately to the empirical formula $4Cu(OH)_2 \cdot CaCl_2 \cdot 4H_2O$.

The recirculation and aeration of the reaction liquor in contact with the copper was continuous, the reaction solution being maintained at approximately its original strength by suitable additions of calcium chloride and ammonium chloride. The solution remained basic without the addition of further amounts of ammonium hydroxide. It was found that the product had been formed at an average rate of 10 lbs. per hour under the conditions of this example. Analysis showed that the last portion of product formed corresponded closely in composition with the first.

Under the conditions of Example 1 it was found that when the reaction liquor was not circulated, the reaction rate was less than one-third that obtained when circulation of the liquor was employed. It will be seen, therefore, that the circulation step accounted for a very substantial increase in the rate of reaction.

In the above example we have shown an arrangement of equipment well adapted to provide simultaneous aeration and recirculation of calcium chloride-ammonium chloride liquors in contact with copper. Other means for securing such simultaneous aeration and recirculation may likewise be employed. For instance, in Example 2, below, there is described a process of our invention in which relative motion between the copper and the solution is secured by external circulation of the liquor augmented by local circulation within the reaction vessel itself.

Example 2

A cylindrical drum was rotatably mounted on a horizontal axis and fitted around its inside periphery with perforated pipes parallel to the axis of rotation and connected to an outside source of compressed air through a hollow axle. An opening fitted with a tight cover was provided in the curved side of the drum. Means was provided for admitting air to these pipes only during the time the pipes were passing through the lower half of the circle of rotation. By means of hollow hubs there was provided at opposite ends of the cylinder an inlet and an egress for circulating solution. The outlet from the drum was connected through a pipe to an open settling tank from which the supernatant liquor substantially free of precipitate could be recirculated back to the drum by means of a pump.

Through the opening there was placed in the drum sufficient cut-up copper scrap to fill the drum about one-third full. A solution was then made up containing, per hundred parts of its total weight, 17 parts of calcium chloride dihydrate, 3.3 parts of ammonium chloride, and enough ammonium hydroxide to make the solution just alkaline to litmus. This solution was pumped into the drum through the inlet hub and, after the drum had become half full, was permitted to overflow through the outlet hub at the opposite end of the drum. Air was then blown into the drum through the distributor pipes and was permitted to escape through the overflow pipe. The circulation of the liquor over the copper was augmented by causing the drum to rotate on its axis.

This simultaneous aeration and circulation of the reaction liquor over the copper was continued for 14 hours, the reaction liquor being maintained at approximately its original concentration by suitable additions of calcium chloride and ammonium chloride. During this time aeration was continued at a rate such that a volume of air equal to the total volume of the drum was passed through the liquor every minute. Circulation of the reaction liquor was carried on at such a rate that a complete change of the liquor in the drum was accomplished every 10 minutes. This general circulation was augmented by local circulation within the drum caused by rotating the drum, the rate of rotation being about 7 revolutions per minute.

It was noted that the reaction proceeded rapidly the overflowing liquor from the drum first becoming a very dark blue color and then containing considerable amounts of precipitate. This precipitate was separated from the recirculating liquor by permitting it to settle out in the settling tank. Analysis showed that the precipitate had the approximate empirical formula $$4Cu(OH)_2 \cdot CaCl_2 \cdot 4H_2O$$

At the end of the 14 hour run it was found that product had been formed at the average rate of 6.7 lbs. per hour. Under conditions similar to those of Example 2 except that the liquor in the drum was not circulated and the drum was not rotated the product was produced at a rate less than three lbs. per hour.

It will be noted that in Examples 1 and 2 there was provided means for removing most of the precipitate from the reaction liquor before it was recirculated. We have found, however, that because of the circulation employed in the processes of our invention it is not necessary to effect a complete removal of the reaction product from the recirculating liquor. On the contrary, we may circulate liquors containing large amounts of precipitate and thereby realize unexpected advantages. It thus becomes possible to dispense with elaborate systems for effecting settling or filtration of the recirculating liquor, thereby lowering the cost of the product. Moreover, we have found that the rate of reaction is increased by having large amounts of precipitate present in the circulating liquor.

The presence of a considerable amount of precipitate in the circulating reaction liquor may be effected in various ways. The liquor may be recirculated from an external source with only a superficial settling step or at a rate to effect recirculation only of the amount required for carrying off the product. Alternatively fresh liquor may be added at a rate sufficiently slow that a high proportion of precipitate is maintained in the reaction liquor within the reaction vessel, circulation being effected locally within the reaction vessel, as by the rotation of the reaction vessel described in Example 2. This method of carrying out a process of our invention is demonstrated in Example 3 below.

*Example 3*

In this example the apparatus of Example 2 was used for accomplishing simultaneous aeration and circulation of reaction liquor over copper.

The reaction was carried out in the following manner. The drum was filled one-third full with scrap copper, closed, and air was blown through at the rate used in Example 2. The drum was rotated at about 7 revolutions per minute. Reaction liquor was circulated through the drum at a rate such that the slurry overflowing from the drum contained about 30% solids on a dry basis. This thick slurry was filtered off and the filtrate was recirculated through the drum.

The run was continued for 14 hours, the liquor fed to the drum being maintained at approximately its original concentration by suitable additions of water and calcium and ammonium chlorides. The precipitate was filtered off, washed and dried. It was found that on the dry basis product had been produced at an average rate of 10 lbs. per hour. An anlysis of the dried product showed it to correspond approximately to the empirical composition $$4Cu(OH)_2 \cdot CaCl_2 \cdot 4H_2O$$

It will be seen from a comparison of Examples 2 and 3 that a remarkable advantage was obtained by having present in the reaction liquor a high concentration of precipitate while simultaneously aerating and circulating the liquor over copper.

In the foregoing examples we have shown certain specific embodiments of the processes of our invention, but it will be understood that considerable deviation from the exact conditions of these examples is possible.

The concentration of the reaction liquor may vary widely without deleteriously affecting the product obtained. It is generally desired to maintain concentrations such that the reaction proceeds at the maximum speed possible. In general, we prefer to use a liquor having a gravity of from about 6 to about 25° Bé. measured at 25° C. and containing calcium chloride dihydrate ($CaCl_2 \cdot 2H_2O$) and ammonium chloride ($NH_4Cl$) in the weight ratio of $Ca/NH_4$ from about 4:1 to about 6:1. More specifically, we prefer to use a liquor having a gravity of about 13–17° Bé. and a $Ca/NH_4$ ratio of about 5:1. The concentrations of calcium chloride and ammonium chloride used in Examples 1, 2 and 3 were such as to give a liquor having a gravity and calcium chloride-ammonium chloride ratio approximating these preferred conditions.

The rate of aeration will necessarily depend on the type and size of equipment used and the character of the metallic copper. Preferably, the rate of aeration should be the maximum permitted by the apparatus used since in addition to supplying oxygen the air agitates the reaction mixture. The use of an excessive amount of air, however, will accomplish no increased benefit and may cause excessive splashing. We have found that by careful controlling the means used for introducing the air into the reaction vessel so as to distribute the air uniformly in the form of fine bubbles we can hold to a minimum the amount of air required.

The method used for accomplishing circulation of the reaction liquor while simultaneously aerating in contact with copper is also capable of various modifications. In the above examples we have shown three such methods, and from these various others will suggest themselves. For instance, in place of rotating drum of Examples 2 and 3, we may employ an oscillating drum which makes only a partial revolution and then reverses. Similarly we may place the copper in a suitable receptacle such as a cage and rotate it through a reaction solution while simultaneously aerating. These and other methods may be used to accomplish circulation in a process of our invention.

In the processes of our invention any temperature suitable to the reaction may be used. The reaction is exothermic, but the heat of the reaction is dissipated by the air blowing through the solution and by evaporation of water from the solution. The reaction temperature of about 50° C. which was used in the foregoing examples represents the temperature at which the heat of reaction balanced the rate of heat dissipation under these specific conditions.

The precipitated product may be removed from the reaction liquor by any suitable means. In the foregoing examples we have shown the use of a settling tank and a filter press. If desired, a system of thickeners such as commonly used for the separation of sludges from liquid could be employed. Similarly, other well known devices in which centrifugal force is used, such as solid bowl or perforate basket type centrifuges, may be applied.

While in the foregoing description of our invention we have shown various specific embodiments, it will be understood that those skilled in the art without departing from the scope of our invention may employ various modifications and equivalents for simultaneously aerating and effecting relative motion of a calcium chloride ammonium chloride liquor in contact with copper or copper-bearing materials to precipitate calcium cuproxy chlorides.

We claim:

1. In a process for producing calcium cuproxy chloride, the method which comprises causing calcium chloride and ammonium chloride to react with pieces of metallic copper of substantial size in an aqueous solution in a reaction vessel, the solution containing in excess of ten per cent of its weight of a calcium cuproxy chloride, such contained calcium cuproxy chloride in excess of that required to saturate the solution being suspended therein, and simultaneously, and in the same vessel, aerating the solution and otherwise causing continuous relative motion between the copper and the solution by continuously removing solution from the reaction zone, separating a portion of the product such that the remaining solution contains at least ten per cent of product in suspension, and continuously returning the thus-treated solution to the reaction zone.

2. In a process for producing calcium cuproxy chloride, the method which comprises causing calcium chloride and ammonium chloride to react with pieces of metallic copper of substantial size in an aqueous solution in a reaction vessel, the solution containing in excess of ten per cent of its weight of a calcium cuproxy chloride, such contained calcium cuproxy chloride in excess of that required to saturate the solution being suspended therein and the dissolved calcium chloride and ammonium chloride contents being such as to give the solution a specific gravity of from about 13 to 17° Bé. at 25° C. and a calcium:ammonium weight ratio of about 5:1, while simultaneously, and in the same vessel, aerating the solution and otherwise causing continuous relative motion between the copper and the solution by continuously removing solution from the reaction zone, separating a portion of the product such that the remaining solution contains at least ten per cent of product in suspension, and continuously returning the thus-treated solution to the reaction zone.

IVAN L. HAAG.
ROBERT PFANSTIEL.